April 15, 1958        G. C. CROWLEY        2,831,099
TEMPERATURE RESPONSIVE ELECTRICAL CONTROL SYSTEM
Filed July 12, 1957
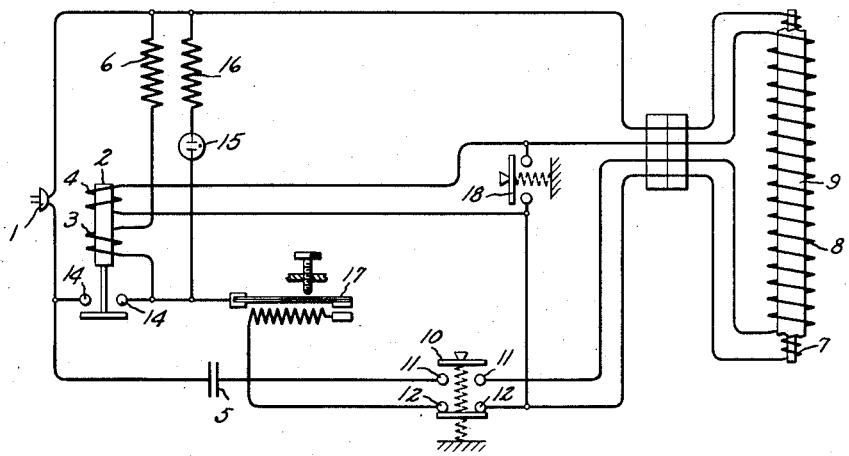
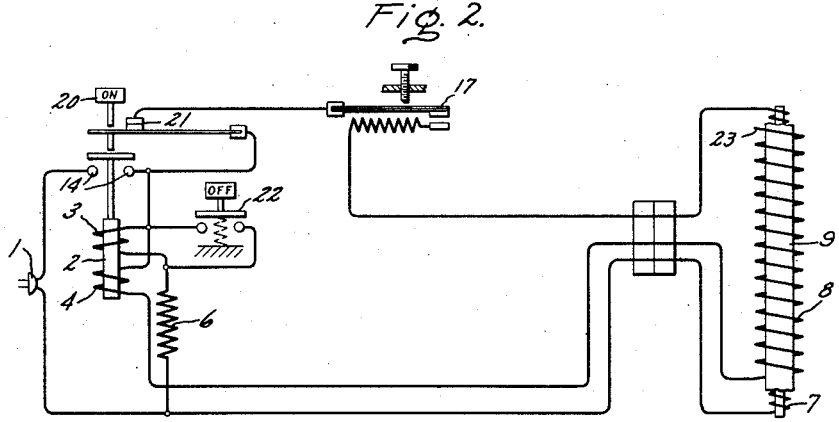
Inventor:
George C. Crowley,
by Lawrence R. Kempton
His Attorney.

United States Patent Office 2,831,099
Patented Apr. 15, 1958

2,831,099

TEMPERATURE RESPONSIVE ELECTRICAL CONTROL SYSTEM

George C. Crowley, Asheboro, N. C., assignor to General Electric Company, a corporation of New York Application July 12, 1957, Serial No. 671,618

13 Claims. (Cl. 219—20)

This invention relates to automatic temperature control circuits for electrically heated devices, and in particular, to an improved control circuit for electric blankets and the like.

One object of this invention is to provide an improved control for an electrically heated device which provides positive protection against an overheated condition at any point within the device.

Another object of this invention is to provide an improved control circuit for a device such as an electric blanket wherein a continuous thermo-sensitive layer within the blanket provides current flow upon any overheated condition in a direction to open the heating circuit.

Still another object of this invention is to provide a control circuit for electric blankets or similar electrically heated devices wherein the heater cannot be supplied with electric operating power until such time as the automatic electrical control circuit has been fully established.

In carrying out the objects of my invention in one form thereof, I utilize a double coil relay having both coils wound on a common core in a control circuit which includes a distributed heater conductor and a co-extensive signal conductor separated therefrom by a thermo-sensitive layer which at normal operating temperature is essentially an insulator and which conducts current of control magnitude at a predetermined higher temperature. The double coil relay operates a relay switch actuated to closed position upon magnetization of the core and released to the open position when magnetization of the core decreases to a predetermined drop-out value. The relay switch is normally maintained in the closed position by a holding circuit including the holding coil and the relay switch connected across the line. An operating circuit is provided which includes the operating coil and the thermo-sensitive layer to decrease magnetization of the core below drop-out value upon flow of significant current through the thermo-sensitive layer.

Other objects and advantages of my invention will become apparent as the following description proceeds, and the features of novelty which characterize my invention will be pointed out with particularity in the claims annexed to and forming part of this specification.

For a better understanding of my invention, reference may be made to the accompanying drawing in which:

Fig. 1 is a schematic diagram of one embodiment of my control circuit; and

Fig. 2 is a schematic design of a second embodiment of my control circuit.

Referring now to the drawing, it can be seen that power is supplied to my control circuit of Fig. 1 by means of plug 1 which affords connection to the power source; for example, the conventional 115 volt, 60 cycle domestic circuit. The relay of my control circuit has a common core 2 on which is wound two coils 3 and 4. Coil 3 is adapted to be connected across the line in series with a resistor 6 so that it will operate properly as a holding coil. In a typical embodiment, resistor 6 may be 5,000 ohms for connection in series with coil 3 having approximately 6000 turns of #43 wire. Relay coil 4 is the operating coil of my double coil relay. Referring again to a typical embodiment, coil 4 may have approximately 21,000 turns of #43 wire. The work device associated with this control is an electric blanket of the type having distributed heater wire and a signal wire co-extensive therewith with a layer of thermo-sensitive material between the wires. The thermo-sensitive material is essentially an insulator at normal operating temperatures and a conductor of a current of control magnitude at a predetermined higher temperature. Such a temperature sensitive heater and control wire construction is disclosed and claimed in U. S. Patent #2,581,212 granted on January 1, 1952, to David C. Spooner, Jr., and Milton S. Greenhalgh and assigned to the General Electric Company, assignee of the instant application. In the drawing I have shown such a thermo-sensitive work device consisting of a heater wire 7 and a signal wire 8, separated by a thermo-sensitive layer 9.

In order to energize the control system, I provide a momentary energizing means or control device 10 having a normally open switch 11 and a normally closed switch 12. In this energizing circuit with switch 11, a capacitor 5 is included for a purpose to be described.

When the momentary control device 10 is depressed, normally closed switch 12 is opened and normally open switch 11 is closed. Therefore, it can be seen that an energizing circuit is completed from the power supply through capacitor 5, normally open switch 11, signal wire 8, operating coil 4, and heater wire 7. The completion of this circuit energizes operating coil 4 to close relay switch 14. In this manner the continuity of both the heater wire 7 and signal wire 8 is checked each time the control is energized. During this time, however, due to the circuitry involved, no appreciable power is supplied to heater 7. In order to increase the voltage across coil 4 and insure that it will operate to close relay switch 14, capacitor 5 is included in the energizing circuit. Upon closure of switch 14, a neon lamp 15 is energized through its associated resistor 16, thereby indicating that the control circuit is ready for operation. A holding circuit is also completed through relay switch 14, this holding circuit including a holding coil 3 for the relay in series with a current limiting resistor 6. When the indicator lamp lights, momentary control device 10 is released, thereby opening switch 11 and closing switch 12. When switch 11 is opened, operating coil 4 is deenergized; but because holding coil 3 has been energized, relay switch 14 remains closed.

During normal operation of the work device, the work circuit is completed and in operation continuously. This work circuit, including typically heater 7 of an electric bedcover, is completed through relay switch 14, an ambient temperature responsive device 17, and normally closed switch 12. The ambient temperature responsive device 17 will control the power input to the work device in response to room temperatures. In order to disconnect or open the circuit whenever desired, I provide stop switch 18 connected across operating coil 4. When stop switch 18 is closed, it shorts out operating coil 4 which then functions as a number of shorted turns on the common relay core 2. This reduces the magnetization in common core 2 below relay drop-out value causing relay switch 14 to open.

To provide protection in case of overheat at any spot or place along heater wire 7, I provide a release circuit which includes heater conductor 7 and signal conductor 8 along thermo-sensitive layer 9 and operating coil 4. Upon conduction of significant current through thermo-sensitive layer 9 adjacent the lower end of signal wire 8 as shown in Fig. 1, operating coil 4 acts as a number of shorted turns on the common relay core 2. The shorted turns reduce the flux in the magnetic circuit which is generated by operating coil 4 to a level at which the relay drops out opening switch 14. When there is conduction of significant current through the thermo-sensitive layer adjacent the other end of the signal wire, that is, the upper end as viewed in Fig. 1, operating coil 4 will be energized in opposition to holding coil 3. This circuit may be traced from the lower terminal of the power supply, through ambient responsive control 17, switch 12, to coil 4, and from the other terminal of coil 4 through layer 9 to the heater wire, and back to the other terminal of the power supply. The magnetizing force from operating coil 4 in opposition to magnetization from holding coil 3 causes the relay to drop out, thereby opening switch 14. It can be seen that if an overheat occurs at any point between the ends of heater wire 7, the combination of the previously described effects, that is, the shorting of coil 4 and the connecting of coil 4 in opposition to coil 3, will cause the relay to drop out opening switch 14, and de-energizing the entire circuit.

Once relay switch 14 opens, the control circuit cannot be placed in operation, nor can the heater be energized until control device 10 is momentarily depressed, completing the circuit once again to energize holding coil 3 and also completing the work circuit as previously described.

In Fig. 2, I have shown a second embodiment of my control circuit. Power is supplied to the control of Fig. 2 by means of plug 1 which as in the case of the circuit shown in Fig. 1 affords connection to the power source; for example, the conventional 115 volt, 60 cycle domestic circuit. The relay used in this control circuit is the same as that used in the circuit of Fig. 1 and has a common core 2 on which is wound two coils 3 and 4. Coil 3 is adapted to be connected across the line in series with resistor 6, whereby it functions as a holding coil for the relay during operation of the circuit. Coil 4 is the operating coil of the double coil relay.

The work device associated with this circuit may be the same as the work device previously described with reference to Fig. 1, typically a heater wire 7 and a signal wire 8 separated by a layer of thermo-sensitive material. While the heater 7 is adapted to be connected across the line, one end of the signal wire 8 is connected to operating coil 4, while the other end 23 of the signal wire is allowed to float electrically free.

This circuit is placed in operation by momentarily depressing energizing means or control device 20 which, in turn, opens a normally closed switch 21 and manually closes relay switch 14. Closure of relay switch 14 completes a holding circuit through coil 3 and resistor 6. As long as coil 3 remains energized without any interfering or opposing effects by coil 4 or "off" switch 22, relay switch 14 remains closed. When the momentary control device 20 is released, normally closed switch 21 will again close, completing a circuit for heater wire 7 through relay switch 14, normally closed switch 21, and the ambient temperature responsive device 17.

The power supply to the heater during operation will vary due to the action of the ambient temperature responsive device 17 depending upon room temperature. In order manually to disconnect the circuit, normally open "off" switch 22 is depressed. Closure of switch 22 shorts out coil 3 thereby reducing the magnetization of the relay below drop-out level and allows normally open relay switch 14 to again open. At this time, the circuit is completely de-energized and cannot be again energized until "on" button 20 is momentarily depressed.

In order to provide overheat protection for the work device, I include a release circuit. This release circuit includes relay switch 14, coil 4, signal wire 8, thermo-sensitive material 9 and heater 7. As can be seen from the drawing, one end 23 of the signal wire is allowed to float electrically free while the other end of the signal wire is connected to coil 4. Conduction of significant current through thermo-sensitive layer 9, for example, at the upper end of signal wire 8 establishes a circuit from the lower terminal of operating coil 4 through signal wire 8, the thermo-sensitive layer, heater wire 7, ambient responsive control 17, and switch 21 to the other terminal of coil 4. Coil 4 therefore acts as a number of shorted turns on relay core, thereby reducing magnetization of the core below relay drop-out level to open switch 14. When there is conduction of significant current through the thermo-sensitive layer adjacent the lower end of the signal wire, operating coil 4 is energized in opposition to holding coil 3. This circuit may be traced from the lower terminal of the power supply to heater 7, through layer 9 to the lower end of signal wire 8, coil 4, and switch 14, to the other side of the line. Flux generated by operating coil 4 in opposition to magnetization from holding coil 3 causes the relay to drop out, thereby opening relay switch 14. It can be seen that if an overheat occurs between the ends of heater 7, a combination of the effects previously described occurs, causing reduction of magnetization of the relay below drop-out level, thereby allowing relay switch 14 to open, de-energizing the circuit.

In accordance with the embodiment of Fig. 2, an overheat can not be continued by a continuous depression of control device 20. I have arranged my circuit shown in Fig. 2 such that depressing control device 20 opens normally closed switch 21, and thereby opens the heater circuit. Also, if control device 20 is jammed so that relay switch 14 cannot open upon an overheat, no damage could result since heater switch 21 opens the heater circuit.

While I have shown and described a specific embodiment of this invention, I do not desire this invention to be limited to the particular construction shown and described, and I intend by the appended claims to cover all such modifications within the true spirit and scope of my invention.

What I claim as new and desire to secure by Letters Patent of the United States is:

1. In a control circuit including a distributed heater conductor and a signal conductor co-extensive with said heater conductor separated therefrom by a thermo-sensitive layer which at normal operating temperature is essentially an insulator and which conducts current of control magnitude at a predetermined higher temperature; that improvement comprising a relay having a holding coil and an operating coil on a common magnetic core; a relay switch actuated to closed position upon magnetization of said core and released to open position when the magnetization of said core is decreased to a predetermined drop-out value; a holding circuit including said holding coil for maintaining said relay switch in closed position; and an operating circuit including said operating coil and said thermo-sensitive layer to decrease magnetization of said core below drop-out value upon flow of significant current through said layer.

2. In a control circuit including a distributed heater conductor and a signal conductor co-extensive with said heater conductor separated therefrom by a thermo-sensitive layer which at normal operating temperature is essentially an insulator and which conducts current of control magnitude at a predetermined higher temperature; that improvement comprising a relay including a holding coil and an operating coil on a common core; a relay switch operated thereby; energizing means to initiate circuit operation including a normally closed switch and means for closing said relay switch; a holding circuit including said holding coil and said relay switch; a work circuit including said relay switch in series with said normally closed switch and said heater conductor; and a release circuit including said thermo-sensitive layer and said operating coil connected to reduce the magnetization of said common core below relay drop-out value upon flow of significant current.

3. In a control circuit including a distributor heater conductor and a signal conductor co-extensive with said heater conductor separated therefrom by a thermo-sensitive layer which at normal operating temperature is essentially an insulator and which conducts current of control magnitude at a predetermined higher temperature; that improvement comprising a relay including a holding coil and an operating coil on a common core; a relay switch operated thereby; an energizing device including a normally closed switch and a normally open switch; an energizing circuit including said normally open switch of said energizing device and said operating coil in series circuit relationship with both of said heater and said signal conductors; a holding circuit including said holding coil and said relay switch; a work circuit including said relay switch in series with said normally closed switch and said heater conductor; and a release circuit including said thermo-sensitive layer and said operating coil connected to reduce the magnetization of said common core below relay drop-out value upon flow of significant current.

4. A control circuit for use with electric blankets of the type having a distributed heater conductor and a signal conductor co-extensive with said heater separated therefrom by a thermo-sensitive layer which at normal operating temperature is essentially an insulator and which conducts current of control magnitude at a predetermined higher temperature, said control circuit comprising a relay including a holding coil and an operating coil on a common core; a relay switch operated thereby; an energizing device including a normally closed switch and a normally open switch; an energizing circuit including said normally open switch of said energizing device and said operating coil in series circuit relationship with both of said heater and signal conductors; a holding circuit including said holding coil and said relay switch; a work circuit including said relay switch in series with said normally closed contacts and said heater conductor; and a release circuit including said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

5. In a control circuit including a distributed heater conductor and a signal conductor co-extensive with said heater and separated therefrom by a thermo-sensitive layer which at normal operating temperatures is essentially an insulator and which conducts current of control magnitude at a predetermined higher temperature; that improvement comprising a relay including a holding coil and an operating coil on a common core; a relay switch operated thereby; an energizing device including a normally closed switch and a normally open switch; an energizing circuit including said normally open switch of said energizing device and said operating coil in series circuit relationship with both said heater and signal conductors; a holding circuit including said holding coil and said relay switch; a work circuit including said relay switch in series with said normally closed contacts of said start switch and said heater conductor; and a release circuit including said heater and signal conductors along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

6. In a control circuit including a control element comprising a heater resistor and a signal wire having between them a layer of material which is substantially an insulator at one temperature and at a predetermined higher temperature a conductor of electricity; that improvement comprising a relay including a holding coil and an operating coil on a common core; a relay switch operated thereby; an energizing device including a normally closed switch and a normally open switch; an ambient temperature responsive device; an energizing circuit including said normally open switch of said energizing device and said operating coil in series circuit relationship with both of said heater and signal conductors; a holding circuit including said holding coil and said relay switch; a work circuit including said relay switch in series with said ambient temperature responsive device and both said normally closed contacts of said start switch and said heater conductor; and a release circuit including said heater and signal conductors along with said thermo-sensitive layer and said operating coil which upon conduction of significant current through said layer adjacent one end of said signal wire short circuits said operating coil, and which upon conduction of significant current through said layer adjacent the other end of said signal wire energizes said operating coil in opposition to said holding coil.

7. In a control circuit including a control element comprising a heater resistor and a signal wire having between them a layer of material which is substantially an insulator at one temperature and at a predetermined higher temperature a conductor of electricity at conventional domestic voltage; that improvement comprising a relay including a holding coil and an operating coil on a common core; a relay switch operated thereby; a control device including a normally closed switch and a normally open switch; a stop switch; an energizing circuit including said normally open switch of said control device and said operating coil in series circuit relationship with both of said heater and signal conductors; a holding circuit including said holding coil and said relay switch; a work circuit including said relay switch in series with said normally closed contacts of said start switch and said heater conductor; a manual release circuit including said stop switch and said operating coil whereby said stop switch short circuits said operating coil; and an automatic release circuit including said heater and signal conductors along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

8. A control circuit for use with electric blankets of the type having a distributed heater conductor and a signal conductor co-extensive with said heater and separated therefrom by a thermo-sensitive layer which at normal operating temperature is essentially an insulator and which conducts current of control magnitude at a predetermined higher temperature, said control circuit comprising a relay including a holding coil and an operating coil on a common core; a relay switch operated thereby; a control device including a normally closed switch and a normally open switch; an ambient responsive temperature device; a stop switch providing normally open contacts; an energizing circuit including said normally open switch of said control device and said operating coil in series circuit relationship with both of said heater and signal conductors; a holding circuit including said holding coil and said relay switch; a work circuit including said relay switch and said ambient temperature device in series with said normally closed contacts of said start switch and said heater conductor; a manual release circuit including said stop switch and said operating coil whereby closure of said contacts of said stop switch short circuits said operating coil; and an automatic release circuit including said heater and signal conductors along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

9. In a control circuit for use with electric blankets of the type having a distributed heater conductor and a signal conductor co-extensive with said heater separated therefrom by a thermo-sensitive layer which at normal operating temperature is essentially an insulator and which conducts current of control magnitude at a predetermined higher temperature; said control circuit comprising a relay including a holding coil and an operating coil on a common core; a relay switch operated thereby; energizing means for said circuit including a normally closed switch and means for closing said relay switch; said normally closed switch being operated to open position upon actuation of said energizing means; a holding circuit including said holding coil and said relay switch; a work circuit including said relay switch in series with said normally closed switch and said heater conductor; and a release circuit including a thermo-sensitive layer and said operating coil which upon conduction of significant current through said layer adjacent one end of said signal wire short circuits an operating coil and which upon conduction of significant current through said layer adjacent the other end of said signal wire energizes said operating coil in opposition to said holding coil.

10. In a control circuit including a distributed heating conductor and a signal conductor co-extensive with said heater and separated therefrom by a thermo-sensitive layer which at normal operating temperature is essentially an insulator and which conducts current of control magnitude at a predetermined higher temperature; that improvement comprising a relay including a holding coil and an operating coil on a common core; a relay switch operated thereby; an energizing device for said circuit including a normally closed switch and means for closing said relay switch; said normally closed switch being operated to open position upon actuation of said energizing means; a holding circuit including said holding coil and said relay switch; a work circuit including said relay switch in series with said normally closed switch and said heater conductor; and a release circuit including said heater and signal conductors along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

11. In a control circuit including a control element comprising a heater resistor and a signal wire having between them a layer of material which is substantially an insulator at one temperature and at a predetermined higher temperature a conductor of electricity; that improvement comprising a relay including a holding coil and an operating coil on a common core; a relay switch operated thereby; an energizing device including a normally closed switch and means for closing said relay switch; said normally closed switch being operated to open position on actuation of said energizing means; an ambient temperature responsive device; a holding circuit including said holding coil and said relay switch; a work circuit including said relay switch and said ambient temperature responsive device in series with said normally closed switch and said heater conductor; and a release circuit including said heater and signal conductor along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

12. In a control circuit including a control element comprising a heater resistor and a signal wire having between them a layer of material which is essentially an insulator at one temperature and at a predetermined higher temperature a conductor of electricity at conventional domestic frequencies; that improvement comprising a relay including a holding coil and an operating coil on a common core; a relay switch operated thereby; a control device including a normally closed switch and means for closing said relay switch; said normally closed switch being operated to open position upon actuation of said energizing means; a stop switch; a holding circuit including said holding coil and said relay switch; a work circuit including said relay switch in series with said normally closed switch and said heater conductor; a manual release circuit including said stop switch and said operating coil whereby said stop switch short circuits said operating coil; and an automatic release circuit including said heater and signal conductors along with said thermo-sensitive layer and said operating coil, which upon conduction of significant current through said layer adjacent one end of said signal wire short circuits said operating coil and which upon conduction of significant current through said layer adjacent the other end of said signal wire energizes said operating coil in opposition to said holding coil.

13. In a control circuit for use with electric blankets of the type having a distributed heater conductor and a signal conductor co-extensive with said heater and separated therefrom by a thermo-sensitive layer which at normally operating temperature is essentially an insulator and which conducts current of control magnitude at a predetermined higher temperature; said control circuit comprising a relay including a holding coil and an operating coil on a common core; a relay switch operated thereby; a control device for said circuit including a normally closed switch and means for closing said relay switch; said normally closed switch being operated to open position upon actuation of said energizing means; an ambient responsive temperature control device; a stop switch providing normally open contacts; a holding circuit including said holding coil and said relay switch; a work circuit including said relay switch and said ambient temperature control device in series with said normally closed switch and said heater conductor; a manual release circuit including said stop switch and said operating coil whereby closure of said contacts of said stop switch short circuits said operating coil; and an automatic release circuit including said heater and signal conductors along with said thermo-sensitive layer and said operating coil which upon conduction of significant current through said layer adjacent one end of said signal wire short circuits said operating coil and which upon conduction of significant current through said layer adjacent the other end of said signal wire energizes said operating coil in opposition to said holding coil.

References Cited in the file of this patent
UNITED STATES PATENTS

| | | |
|---|---|---|
| 2,565,478 | Crowley | Aug. 28, 1951 |
| 2,588,926 | Holmes | Mar. 11, 1952 |
| 2,610,797 | Miller | Sept. 16, 1952 |
| 2,768,274 | Estes | Oct. 23, 1956 |